US008458111B2

(12) United States Patent
Wolf et al.

(10) Patent No.: US 8,458,111 B2
(45) Date of Patent: Jun. 4, 2013

(54) RUNTIME INTERPRETATION OF DECLARATIVE PROGRAMS

(75) Inventors: Kenneth D. Wolf, Seattle, WA (US); Kavita Kamani, Issaquah, WA (US); Ramrajprabu Balasubramanian, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 540 days.

(21) Appl. No.: 12/470,222

(22) Filed: May 21, 2009

(65) Prior Publication Data

US 2010/0299300 A1    Nov. 25, 2010

(51) Int. Cl.
*G06F 17/00* (2006.01)
*G06N 5/02* (2006.01)

(52) U.S. Cl.
CPC ........................................ *G06N 5/02* (2013.01)
USPC .............................................................. 706/46

(58) Field of Classification Search
USPC ................. 706/46, 55, 62; 717/139; 705/500, 705/328, 331
See application file for complete search history.

(56) References Cited

U.S. PATENT DOCUMENTS

| 6,973,644 | B2 | 12/2005 | Nylander |
| 7,272,820 | B2 | 9/2007 | Klianev |
| 7,451,432 | B2 | 11/2008 | Shukla |
| 2005/0289450 | A1 | 12/2005 | Bent |
| 2006/0123048 | A1* | 6/2006 | Larson ................... 707/103 R |
| 2007/0169011 | A1* | 7/2007 | Ramani et al. ............ 717/136 |
| 2008/0127040 | A1 | 5/2008 | Barcellona |
| 2008/0196018 | A1 | 8/2008 | Russ |
| 2009/0006154 | A1 | 1/2009 | Hao |
| 2009/0024426 | A1 | 1/2009 | Chang |
| 2009/0064091 | A1 | 3/2009 | Tonkin |

OTHER PUBLICATIONS

Karsai et al, "On the Use of Graph Transformation in the Formal Specification of Model Interpreters", Journal of Universal Computer Science, vol. 9, No. 11 (2003), 1296-1321submitted: Jun. 21, 2003, accepted: May 9, 2003, appeared: Nov, 28, 2003.*
Zhang et al, "ModelML: a Markup Language for Automatic Model Synthesis", IEEE International Conference on Information Reuse and Integration, 2007, IRI 2007, Issue Date: Aug. 13-15, 2007, on pp. 317-322, Date of Current Version: Sep. 4, 2007.*
Shetty, et al.; "XAML-its purpose"; Sep. 2006; pp. 1-3; http://social.msdn.microsoft.com/Forums/en-US/wpf/thread/0b01cac3-505b-484e-826f-55df384efa9b/ (Copy Attached).
Box, et al.; "Simplify Development with the Declarative Model of Windows Workflow Foundation"; 2009; pp. 1-7; http://msdn.microsoft.com/hi-in/magazine/cc163661(en-us).aspx (Copy Attached).
Milner; "Loading Workflow Models in WF"; 2009; pp. 1-4; http://msdn.microsoft.com/en-us/magazine/cc507645.aspx (Copy Attached).
Author Unknown; "ICustomTypeDescriptor Interface"; 2009; pp. 1-2; http://msdn.microsoft.com/en-us/library/system.componentmodel.icustomtypedescriptor(VS.80).aspx (Copy Attached).

* cited by examiner

*Primary Examiner* — Alen Chen
*Assistant Examiner* — Ilya Traktovenko
(74) *Attorney, Agent, or Firm* — Workman Nydegger

(57) ABSTRACT

Embodiments are directed to interpreting declarative program types at runtime without compiling and mapping between a declarative type and a dynamic runtime type. A computer system accesses a portion of a declarative program, where the declarative program includes fully modeled activity types. The computer system dynamically constructs a dynamic activity type based on one of the fully modeled activity types of the declarative program, where the dynamic activity type is configured for interpretive execution without compilation. The computer system also interpretively executes the dynamically constructed dynamic activity type such that the dynamic activity is executed without compilation.

20 Claims, 4 Drawing Sheets

RUNTIME INTERPRETATION OF DECLARATIVE PROGRAMS

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

One type of software is referred to as a "runtime". A runtime generally provides underlying functionality that can be used by multiple different applications that run on a computing system. Some runtimes may be configured to execute activities. An activity generally represents a unit of executable code that may be part of a software application or part of an application function. As activities are executed, the runtime may be configured to track when each activity was executed and, in some cases, identify program state before and after execution.

BRIEF SUMMARY

Embodiments described herein are directed to interpreting declarative program types at runtime without compiling and mapping between a declarative type and a dynamic runtime type. In one embodiment, a computer system accesses a portion of a declarative program, where the declarative program includes fully modeled activity types. The computer system dynamically constructs a dynamic activity type based on one of the fully modeled activity types of the declarative program, where the dynamic activity type is configured for interpretive execution without compilation. The computer system also interpretively executes the dynamically constructed dynamic activity type such that the dynamic activity is executed without compilation.

In another embodiment, a computer system accesses a fully modeled declarative type, where the declarative type is part of a declarative program designed for execution in a continuation-based runtime, and where the declarative type includes an associated mapping schema for mapping from a declarative type to a dynamic type. The computer system creates a dynamic runtime type based on the fully modeled declarative type. The computer system also generates a mapping from the accessed declarative type to the created dynamic runtime type using the mapping schema.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
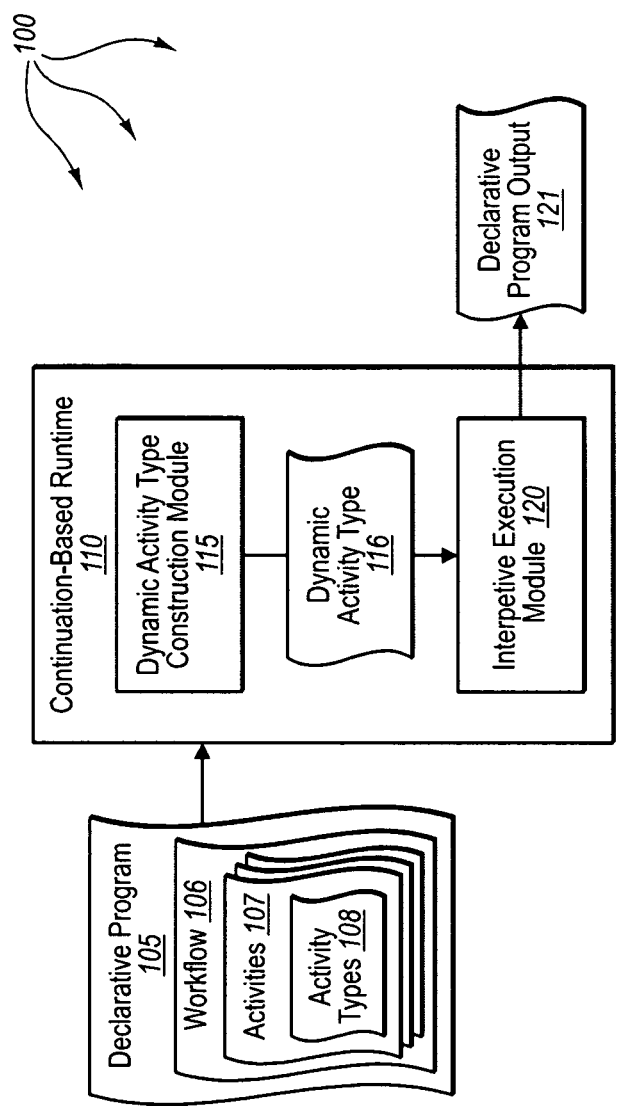
FIG. 1 illustrates a computer architecture in which embodiments of the present invention may operate including interpreting declarative program types at runtime without compiling and mapping between a declarative type and a dynamic runtime type.

Embodiments described herein are directed to interpreting declarative program types at runtime without compiling and mapping between a declarative type and a dynamic runtime type. In one embodiment, a computer system accesses a portion of a declarative program, where the declarative program includes fully modeled activity types. The computer system dynamically constructs a dynamic activity type based on one of the fully modeled activity types of the declarative program, where the dynamic activity type is configured for interpretive execution without compilation. The computer system also interpretively executes the dynamically constructed dynamic activity type such that the dynamic activity is executed without compilation.

In another embodiment, a computer system accesses a fully modeled declarative type, where the declarative type is part of a declarative program designed for execution in a continuation-based runtime, and where the declarative type includes an associated mapping schema for mapping from a declarative type to a dynamic type. The computer system creates a dynamic runtime type based on the fully modeled declarative type. The computer system also generates a mapping from the accessed declarative type to the created dynamic runtime type using the mapping schema.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, as discussed in greater detail below.

Embodiments within the scope of the present invention also include physical and other computer-readable storage media for carrying or storing computer-executable instructions and/or data structures. Such computer-readable media can be any available media that can be accessed by a general purpose or special purpose computer system. Computer-readable media that store computer-executable instructions are physical storage media including recordable-type storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or transport desired program code means in the form of computer-executable instructions or data structures and which can be accessed by a general purpose or special purpose computer. Combinations of the above should also be included within the scope of computer-readable media.

However, it should be understood, that upon reaching various computer system components, program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates a computer architecture 100 in which the principles of the present invention may be employed. Computer architecture 100 includes continuation-based runtime 110. Continuation based runtime 110 is configured to execute activities (e.g. 107). As used herein, an activity represents a unit of executable code including one or more work items. Some activities contain child activities, and are known as composite activities. Composite activities schedule multiple work items for executing their child activities. This composition of activities enables custom control flows that can be implemented through the scheduling of child activities 0, 1 or n times as determined by the composite activity.

An activity can also setup a resumable continuation in its execution that is resumed by a stimulus external to the runtime. The continuation-based runtime (CBR) may interpret this external stimulus as another item of work to be handled by the activity. Work items are represented internally as continuations that the runtime invokes on activities. Beyond this flexibility to create control flows and handle external resumptions, activities have the following characteristics: they have no process affinity (i.e. they can be paused and resumed in a different process), they have no thread affinity (i.e. different items of work can be run on different threads), and they can be stored and reloaded at a later point in time.

Continuation-based runtime 110 may be configured to execute activities 107 which are part of a declarative (continuation-based) program 105. Program 105 includes workflow 106 which includes corresponding activities 107 which, in turn, may each include one or more associated work items and/or activity types 108. Activity types, as used herein, refer to user-definable types that define a format, memory space or other identifier for software code types. Program 105 may include multiple workflows, multiple activities, multiple work items, multiple activity types, etc. In some embodiments, CBR 110 includes dynamic activity type construction module 115. Module 115 may be configured to create or construct dynamic activity types based on declarative types. Whereas declarative types are compiled as part of executing declarative program 105, dynamic runtime types do no have to be compiled before the program is loaded. Instead, dynamic activity types 116 can be interpreted at runtime by interpretive execution module 120.

Interpretive execution module 120 may be configured to interpretively execute a declarative program 105. The program may be interpreted at least in part by accessing a derived dynamic activity type 116 which was derived from one or more existing declarative activity types 108. Accordingly, continuation-based runtime 110 may interpretively execute a declarative program and produce a declarative program output 121 as a result. The declarative program output is generated using at least one dynamic activity type. Interpretive execution and dynamic activity type creation will be explained in greater detail below with regard to method 200 of FIG. 2.

Figure 2:
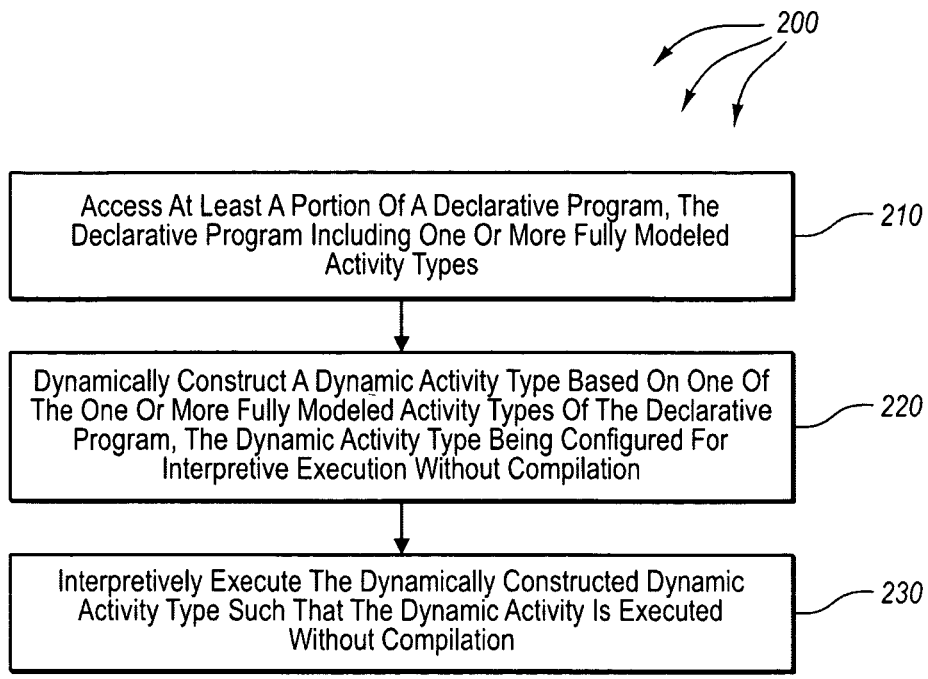
FIG. 2 illustrates a flowchart of an example method for interpreting declarative program types at runtime without compiling.

FIG. 2 illustrates a flowchart of a method 200 for interpreting declarative program types at runtime without compiling. The method 200 will now be described with frequent reference to the components and data of environments 100 of FIG. 1 and 500 of FIG. 5.

Method 200 includes an act of accessing at least a portion of a declarative program, the declarative program including one or more fully modeled activity types (act 210). For example, continuation-based runtime 110 may access declarative program 105, where program 105 includes fully modeled activity type 108. As used herein, fully modeled activity types include those activities whose execution logic is modeled as other activities. An example of a fully modeled activity called "Test" (a.k.a "Test.xaml") will now be set forth as follows with line numbering added for clarity and for purposes of subsequent reference:

```
1.    <Activity x:Class="Test"
2.       xmlns:x="http://schemas.microsoft.com/winfx/2006/xaml"
3.       xmlns:my="clr-namespace:MyActivities;assembly=
4.          MyActivities"
5.       xmlns:s="clr-namespace:System;assembly=mscorlib"
6.       xmlns="http://schemas.microsoft.com/netfx/2009/xaml/activities">
7.       <x:Members>
8.          <x:Member Name="Message" Type="InArgument(s:String)" />
9.       </x:Members>
10.      <Sequence>
11.         <my:WriteLine Text='["Message is " + Message]' />
12.      </Sequence>
13.   </Activity>
```

In this particular activity example, the activity is expressed declaratively using extensible application markup language (XAML) formatting. Lines 1-13 represent the entire parent activity, which is called "Test" and contains one child activity ("Sequence"). Lines 2-6 describe various schemas that are to be included for activity execution. These schema inclusions define how the activity is to be interpreted by the runtime. Lines 7-9 describe the members of the type which comprise the public facing data flow for the activity. Lines 10-12 define the body which uses type members to provide the model's execution logic. Lines 7-9 define message arguments for the message that is to be printed out in lines 10-12. In this example, when using the "Test" activity, a string value will be provided by the calling activity or entity (referred to as "Message" in the example. This information can be interpreted by interpretive execution module 120 into a dynamic activity runtime form, as will be explained below with regard to act 230.

Figure 5:
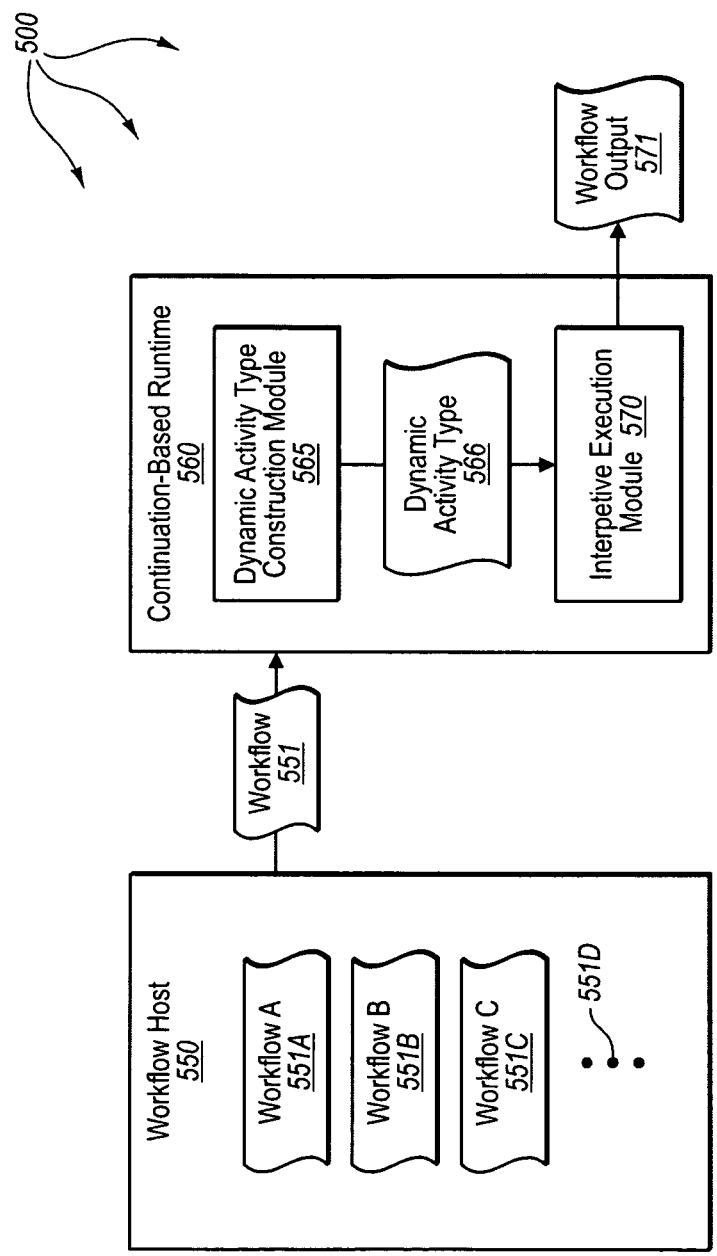
FIG. 5 illustrates a computer architecture that includes a workflow host.

In some embodiments, declarative program 105 includes one or more workflows (e.g. 106). For example, as illustrated in FIG. 5, workflows A, B and C (551A, 551B and 551C, respectively, with element 551D representing additional workflows) may be stored in a repository and may be accessible through workflow host 550. As used herein, workflow host 550 may be a software hosting system configured to manage activity and workflow execution by distributing workflows (e.g. workflow 551) on demand to various communicatively attached computing systems.

In some cases, the workflow host may be configured to load and execute (the stored) workflows on-the-fly. In other case, the workflow host may distribute workflows to various different continuation-based runtimes. As such, CBR 560 may receive workflow 551 and may process the workflow in a similar manner to that described with reference to FIG. 1, where dynamic activity construction module 565 constructs dynamic activity type 566 which is then sent to interpretive execution module 570 for interpretive execution. The resulting workflow output 571 may then be sent back to the initiating computer system either directly or via the workflow host.

The repository of the workflow host may also store fully modeled activities such as "Test.xaml" in XAML form. The repository can also store compiled static types that are callable using associated static tags. These compiled static types may be callable by a workflow host or by a continuation-based runtime. The static types may have been compiled from another software program or programming language and may be in the form of CLR types. In some cases, a workflow host may allow for dynamic handling of the stored, compiled static types, where no static naming is used.

Method 200 includes an act of dynamically constructing a dynamic activity type based on one of the one or more fully modeled activity types of the declarative program, the dynamic activity type being configured for interpretive execution without compilation (act 220). For example, dynamic activity type construction module 115 may construct dynamic activity type 116 based on fully modeled activity type 108 of declarative program 105. Dynamic activity type 116 may be configured for interpretive execution by interpretive execution module 120 of CBR 110 without being compiled. That is, module 120 may receive a dynamic activity type and interpretively execute that type in its uncompiled form.

In some embodiments, custom type information may be added to the dynamically constructed activity type 116 prior to interpretive execution. Indeed, in some cases, the added portions of custom type information may be added dynamically at runtime. Such custom type information may include a property descriptor for properties of the dynamically constructed dynamic activity type. Additionally or alternatively, the custom type information may include information received from a user which is to be referenced during interpretive execution and is intended to alter, in some way, how the dynamic activity type is to be interpreted. Accordingly, dynamic activity type 116 can be modified on-the-fly before interpretive execution using custom type information. In some cases, a user may be able to write a custom type resolver configured to reference interpreted types interchangeably with common language runtime types.

Method 200 also includes an act of interpretively executing the dynamically constructed dynamic activity type such that the dynamic activity is executed without compilation (act 230). For example, interpretive execution module 120 may interpretively execute dynamically constructed activity type 116 without compiling the type (116). As illustrated in the example below, the activity called "Test" from the example above can be implemented in a constructed dynamic activity type called "DynamicActivity." An example code portion will now be set forth as follows with line numbering added for clarity and for purposes of subsequent reference:

```
1.  DynamicActivity program;
2.  using (FileStream file = File.Open(@"Test.xaml", FileMode.Open))
3.  {
4.     program = ActivityXamlServices.Load(file);
5.     WorkflowInvoker.Invoke(program,
6.        new Dictionary<string, object> { { "Message", "my
           text" } });
7.  }
```

In this particular example, line 1 identifies the program. Line 2 initiates a file open command which opens the "Test.xaml" file. The program loads the fully modeled activity ("Test") in lines 3 and 4. In lines 5 and 6, the program is invoked and the activity is interpreted without compiling the activity type. In some cases, as will be shown below, the dynamic activity type may be serialized to dynamic XAML form, where the activity is modeled without using class definitions. As such, this example will be continued below with regard to FIGS. 3 and 4.

Figure 3:
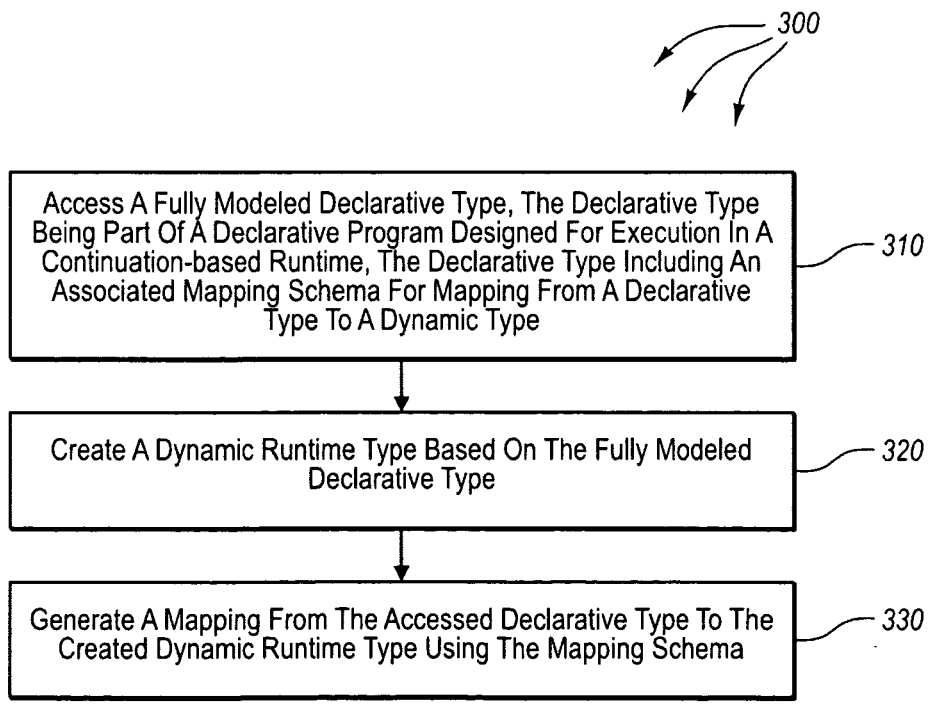
FIG. 3 illustrates a flowchart of an example method for mapping between a declarative type and a dynamic runtime type.
Figure 4:
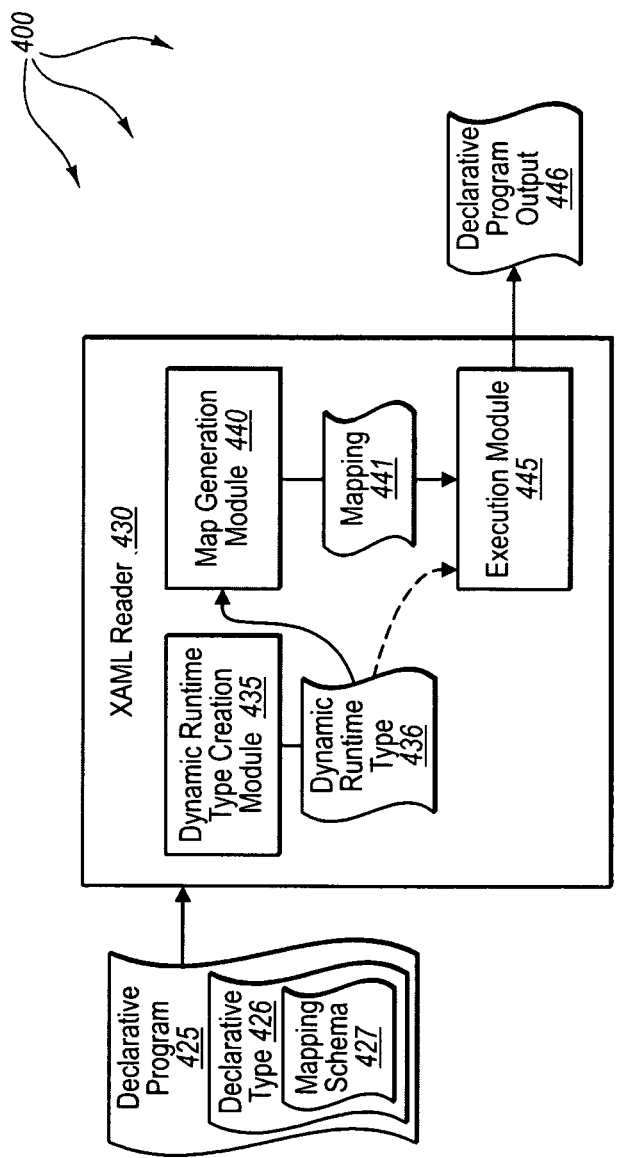
FIG. 4 illustrates an alternative computer architecture that includes an XAML reader.

FIG. 3 illustrates a flowchart of a method 300 for mapping between a declarative type and a dynamic runtime type. The method 300 will now be described with frequent reference to the components and data of environment 400 of FIG. 4.

Method 300 includes an act of a customized XAML reader accessing a fully modeled declarative type, the declarative type being part of a declarative program designed for execution in a continuation-based runtime, the declarative type including an associated mapping schema for mapping from a declarative type to a dynamic type (act 310). For example, customized XAML reader 430 may access fully modeled declarative type 426 where declarative type 426 is part of declarative program 425 which is designed for execution in a continuation-based runtime. The declarative type may include associated mapping schema 427 for mapping from a declarative type to a dynamic type. XAML reader 430 may be configured to access or receive declarative program 425 (along with declarative type 426 and mapping schema 427) and create a mapping between the declarative type and a dynamic runtime type 436.

In some cases, the associated mapping schema may be user-swappable. Accordingly, a user could update or replace the schema on-the-fly. Moreover, as the declarative type may be interpreted in various different ways using different mapping schemas, a user may swap in different schemas for achieve different output results. Additionally or alternatively, the mapping schema may correspond to a group of related declarative types that are to be interpreted in a similar fashion. Accordingly, if a user had a group of related declarative types, the user could create a schema mapping for the group such that the group would be interpreted by the execution module in a similar fashion.

Method 300 includes an act of the customized XAML reader creating a dynamic runtime type based on the fully modeled declarative type (act 320). For example, customized XAML reader 430 may create dynamic runtime type 436 which is based on the fully modeled declarative type 426. Continuing the above example regarding the "Test.xaml" file, the following code sample illustrating a dynamic activity type is provided with line numbering added for clarity and for purposes of subsequent reference:

```
1.   <DynamicActivity Name="Test">
2.       <DynamicActivity.Properties>
3.           <DynamicActivityProperty     Name="Message"
Type="InArgument(x:String)">
4.           </DynamicActivityProperty>
5.       </DynamicActivity.Properties>
6.       <Sequence>
7.           <WriteLine>["Message is " + Message]</WriteLine>
8.       </Sequence>
9.   </DynamicActivity>
```

In this example, lines 1-9 generally describe a dynamic activity named "Test." Lines 2-5 define the properties of the dynamic activity. Specifically, these lines define a name and a type for the dynamic activity's properties. In at least some embodiments, these properties are dynamically loaded without being compiled. Moreover, an in-memory type representing the declarative type is generated and executed without creating a corresponding CLR type. Lines 6-8 describe a child activity, "Sequence," that is configured to print a message line substantially similar to or the same as that produced in lines 10-12 of the first example code portion above.

Method 300 includes an act of the XAML reader generating a mapping from the accessed declarative type to the created dynamic runtime type using the mapping schema (act 330). For example, XAML reader 430 may generate mapping 441 from declarative type 426 to dynamic runtime type 436 using mapping schema 427. The mapping is used by execution module 445 to interpret the declarative type using the generated mapping 441 between the declarative type and the dynamic type, resulting in declarative program output 446. The mapping, in effect, forms a bridge between the declarative type and the generated, interpretively-executable dynamic runtime type. In this manner, a modeled activity may be loaded on-the-fly in response to a received user indication without loading any common language runtime types corresponding to that modeled activity. That activity may then be interpretively executed using the generated mapping between the declarative type of the activity and the dynamic runtime type.

Accordingly, a declarative program and its associated declarative activity types may be interpreted at runtime without being compiled. Moreover, the declarative types of the declarative program can be mapped, according to a mapping schema, to dynamic runtime types, which are then interpretively executed in a continuation-based runtime.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including a processor and a memory, a computer-implemented method for interpreting declarative program types at runtime without compiling, the method comprising:

an act of the computer system accessing at least a portion of a declarative program that defines a parent activity using a declarative language, the parent activity including a fully modeled activity type that includes one or more members which define a data flow for the fully modeled activity type, each member including a name and a type of input for the member, wherein the parent activity also includes an identification of a schema to be used to determine how the fully modeled activity type is to be interpreted at runtime by a continuation-based runtime;

an act of the computer system dynamically constructing a dynamic activity type based on the fully modeled activity type of the declarative program, the dynamic activity type being configured for interpretive execution by the continuation-based runtime without compilation, dynamically constructing the dynamic activity type comprising:

generating, based on the schema defined in the declarative program, a type in memory without creating a common language runtime type to represent the fully modeled activity type, and mapping, based on the schema defined in the declarative program, each member of the fully modeled activity type to a property of the in-memory type; and an act of the computer system interpretively executing the dynamically constructed dynamic activity type within the continuation-based runtime at a first process, such that the dynamic activity type is executed without compilation, and during execution of the dynamically constructed dynamic activity type:
    pausing execution of the dynamically constructed dynamic activity type at the first process; and
    resuming execution of the dynamically constructed dynamic activity type at a second, different process.

2. The method of claim 1, wherein the declarative program comprises a workflow.

3. The method of claim 2, wherein multiple workflows are stored in a repository and are accessible through a workflow host.

4. The method of claim 3, wherein the workflow host loads and executes the workflows on-the-fly.

5. The method of claim 3, wherein the repository includes one or more compiled static types that are callable using associated static tags.

6. The method of claim 5, wherein the workflow host allows for dynamic handling of the compiled static types, such that no static naming is used.

7. The method of claim 1, wherein mapping each member of the fully modeled activity type to a property of the dynamic activity type includes assigning the name of the member to the name of the property.

8. The method of claim 1, wherein mapping each member of the fully modeled activity type to a property of the dynamic activity type includes assigning an input parameter defined in the member to an input parameter of the property.

9. The method of claim 1, further comprising an act of executing a custom type resolver that is configured to reference interpreted types interchangeably with common language runtime types.

10. The method of claim 1, wherein the declarative language comprises extensible application markup language (XAML).

11. A computer program product for implementing a method for mapping between a declarative type and a dynamic runtime type, the computer program product comprising one or more physical storage media having stored thereon computer-executable instructions that, when executed by one or more processors of the computing system, cause the computing system to perform the method, the method comprising:
    an act of a customized declarative language reader accessing an activity that is defined using a declarative language, and that is configured to be executed within a continuation-based runtime, the activity including a fully modeled declarative type written in declarative markup, the declarative type including one or more members which define a data flow for the declarative type, each member being defined within a declarative tag in the declarative markup and including a name and a type of input for the member, wherein the declarative markup also includes an identification of a schema to be used to determine how the fully modeled declarative type is to be interpreted at runtime by the continuation-based runtime including how the one or more members of the declarative type are to be mapped to properties of a dynamic runtime type;
    an act of the customized declarative language reader creating a dynamic runtime type based on the fully modeled declarative type, creating the dynamic runtime type comprising generating, based on the schema defined in the declarative program, a type in memory without creating a common language runtime type to represent the declarative type;
    an act of the declarative language reader generating a mapping from the accessed declarative type to the created dynamic runtime type using the mapping schema, generating the mapping including mapping each member of the declarative type to a property of the created dynamic runtime type; and
    an act of interpretively executing the dynamically constructed dynamic activity type within the continuation-based runtime at a first process, such that the dynamic activity type is executed without compilation, and during execution of the dynamically constructed dynamic activity type:
        pausing execution of the dynamically constructed dynamic activity type at the first process; and
        resuming execution of the dynamically constructed dynamic activity type at a second, different process.

12. The computer program product of claim 11, wherein the schema for mapping from a declarative type to a dynamic type is swappable.

13. The computer program product of claim 12, wherein the declarative type is interpretable in one or more different ways using different mapping schemas.

14. The computer program product of claim 11, wherein the mapping schema corresponds to a group of related declarative types that are to be interpreted in a similar fashion.

15. The computer program product of claim 11, further comprising an act of interpreting the declarative type using the generated mapping between the declarative type and the dynamic type.

16. The computer program product of claim 11, further comprising an act of loading a modeled activity on-the-fly in response to a received user indication without loading any common language runtime types corresponding to the modeled activity.

17. The computer program product of claim 11, wherein the declarative language comprises extensible application markup language (XAML).

18. A computer system comprising the following:
    one or more processors;
    system memory;
    one or more computer-readable storage media having stored thereon computer-executable instructions that, when executed by the one or more processors, causes the computing system to perform a method for interpreting declarative program types at runtime without compiling, the method comprising the following:
        an act of accessing at least a portion of a declarative program that defines a parent activity using a declarative language, the declarative program written in XAML markup, the parent activity including a fully modeled activity type that includes one or more members which define a data flow for the fully modeled activity type, each member being defined within a XAML tag in the XAML markup and including a name and a type of input for the member, wherein the XAML markup also includes an identification of a schema to be used to determine how the fully modeled activity type is to be interpreted at runtime by a continuation-based runtime;
        an act of dynamically constructing a dynamic activity type based on the fully modeled activity type of the declarative program, the dynamic activity type being configured for interpretive execution by the continuation-based runtime without compilation, dynamically constructing the dynamic activity type comprising:
            generating, based on the schema defined in the declarative program, a type in memory without creating a common language runtime type to represent the fully modeled activity type, and mapping, based on the schema defined in the declarative program, each member of the fully modeled activity type to a property of the in-memory type;

an act of interpretively executing the dynamically constructed dynamic activity type such that the dynamic activity is executed without compilation;

an act of receiving a modification to the declarative program that modifies the schema;

an act of dynamically constructing another dynamic activity type based on the fully modeled activity type of the declarative program, the other dynamic activity type being configured for interpretive execution without compilation, dynamically constructing the other dynamic activity type comprising:

generating, based on the modified schema defined in the declarative program, a type in memory without creating a common language runtime type to represent the fully modeled activity type, and mapping, based on the modified schema defined in the declarative program, each member of the fully modeled activity type to a property of the in-memory type;

an act of interpretively executing the dynamically constructed other dynamic activity type within the continuation-based runtime at a first process, such that the other dynamic activity type is executed without compilation, and during execution of the dynamically constructed dynamic activity type:

pausing execution of the dynamically constructed dynamic activity type at the first process; and resuming execution of the dynamically constructed dynamic activity type at a second, different process.

19. The computer system of claim 18, wherein mapping each member of the fully modeled activity type to a property of the dynamic activity type and the other dynamic activity type includes assigning the name of the member to the name of the property.

20. The computer system of claim 19, wherein mapping each member of the fully modeled activity type to a property of the dynamic activity type or other dynamic activity type includes assigning an input parameter defined in the member to an input parameter of the property.

* * * * *